Patented June 9, 1931

1,809,249

UNITED STATES PATENT OFFICE

JOHN D. MORGAN, OF MAPLEWOOD, NEW JERSEY, ASSIGNOR TO DOHERTY RESEARCH COMPANY, OF NEW YORK, N. Y., A CORPORATION OF DELAWARE

REFRACTORY

No Drawing. Application filed October 15, 1928. Serial No. 312,573.

The present invention relates to refractories and more particularly to refractories formed primarily of compounds containing zirconium.

It is well-known that many bonded refractories change permanently in volume to a troublesome extent when used under furnace conditions. This fact considerably restricts the use of bonded refractories, since the change in volume makes it difficult to manufacture the refractory products to specified dimensions. Moreover, the change in volume is often progressive so that it continues after the refractories have been put in place, thereby weakening the structure in which the refractories are used and leading to high cost of repair and replacement. All commercial refractories except silica or those high in silica, shrink when used under furnace conditions. Silica and certain substances and compositions high in silica on the other hand undergo a progressive increase under furnace conditions.

In particular, the substance known as zirconia ($ZrO_2$) is known to be highly refractory and many attempts have been made to use it on a large scale, but with very little success. Zirconia shrinks materially in furnace use and its shrinkage characteristic can not be overcome even by fusing the zirconia in the electric arc. When the electrically shrunk zirconia is ground and bonded and then refired to form an article of predetermined form, the shrinkage characteristic of the zirconia re-exerts itself strongly when heated.

The present invention is based on the discovery that the permanent change in volume of a refractory substance when in the furnace can be materially reduced and often eliminated by bonding the given refractory with a small amount of substance having a volume change characteristic of the opposite sign from that of the material or substance bonded. For instance, the shrinkage of zirconia can be markedly reduced by bonding it with certain compounds containing silica. It is well-known that silica tends to expand when fired. However, the present invention is not limited to the use of compounds containing silica as other refractory bonds having the characteristic of expanding when fired may be substituted according to the present invention for those containing silica.

The preferred refractory product according to the present invention is one composed predominately of zirconia bonded by a double phosphate of zirconium and silicon.

In making the refractory product according to the present invention, the procedure may be varied somewhat according to the refractory bond to be used. Assuming that zirconia is to form the body of the refractory, it is permissible to form the product by wetting a zirconia aggregate containing particles of graded sizes with a solution of sodium silicate. Silica may then be precipitated in contact with the zirconia particles by adding a solution of sodium carbonate. It will be understood that other ways of introducing a silica bond into a refractory are known to those skilled in the art and I do not limit myself to the one just described. The resulting mixture of silica, zirconia and common salt is then preferably washed to remove the salt before the article is fired. After removing the salt by washing, the mixture of zirconia and silica is then shaped and fired. Preferably a temperature of 1800° F. or over is used in the firing.

It has been found, however, that silicon phosphate or zirconium-silicon phosphate is an even better bond for zirconia than silica. The process just described may therefore be varied by adding to the mixture of silica and zirconia after the washing, sufficient phosphoric acid or $P_2O_5$ or other form of phosphates, to convert the silica to a silicon phosphate. The silica having been recently precipitated is readily attacked by the phosphoric acid.

The preferred method of making the refractory according to the present invention is, however, to add the silica to the zirconia in the form of zircon (zirconium silicate). The silica is then dissolved from the silicate by the phosphoric acid. For example, an aggregate containing 82% of zirconia ground to pass a 40 mesh screen was mixed with 9% of milled zircon grain of 300 mesh fineness and sufficient phosphoric acid to contain 9% of $P_2O_5$ of the zirconia-zircon mixture was added to the mixture. After shaping and firing to 1800° F., neither contraction or expansion occurred. That the result just stated is caused primarily by the silica content of the mixture is shown by the fact that either expansion or contraction of the fired article can be produced by varying the amount of zircon and thereby the amount of silica in the mixture. If a mixture is made to contain 45.5% of 40 mesh $ZrO_2$; 22.75% native zircon grain; 22.75% milled zircon grain; and 9% of $P_2O_5$, an expansion of .14% will occur when fired at 1800° F. In this case the phosphate bond produced is high in silica owing to the considerable percentage of zircon in the mixture. If the mixture, however, contains 86.5% of $ZrO_2$, 4.5% of milled zircon grain and 9% of $P_2O_5$, a contraction of .17% will occur. In this case, the phosphate bond is low in silica being mostly zirconium phosphate, but the amount of silica present, presumably as a double phosphate of zirconium and silicon, is nevertheless sufficient to greatly reduce the natural shrinkage of the zirconia. It will be apparent from the examples just given that the product according to the present invention can be bonded to have a definite permanent volume change when heated or zero volume change as desired. However, the ordinary limits of permanent volume change permitted for refractories in commercial use are within 2%.

It will be understood from the foregoing that where reference is made to silica, the term is used to include not only the compound $SiO_2$ in a free state, but also when embodied in other compounds and more particularly in silicates or like substances containing silicon and oxygen. Also the terms silicon phosphate will be understood to include double salts of silicon and phosphoric acid. For instance, when phosphoric acid acts on the zirconia-zircon mixture, it appears to form a double phosphate of zirconium and silicon.

While silica per se forms a satisfactory bond for many refractories, its use with zirconia is somewhat restricted for the reason that zirconia is so much more refractory than silica. Silica often volatilizes at temperatures at which zirconia is not affected. Silicon phosphate and zirconium silicon phosphate on the other hand have been found not to volatilize or soften at temperatures as high as 3000° F. These bonding substances may in fact withstand considerably higher temperatures, but it has not been found convenient to test them above 3000° F.

It will be understood further that the percentage of a bond to be used with a given refractory substance in order to neutralize to a given extent the permanent volume change of the refractory under furnace conditions, varies to a considerable extent with the refractory and the bond. It is advisable therefore in each case to determine the amount of bond to be used by a preliminary laboratory test, and therefore, it is not attempted to give percentage figures except for the mixture of zirconia, zircon and phosphoric acid as stated above.

It will be understood also that the tendency to permanent shrinkage of refractories other than zirconia or of zirconia-zircon mixtures may be wholly or largely offset by bonds having a swelling characteristic under furnace conditions and especially by silica or by silicon phosphate or double phosphate of silicon and another metal.

Having thus described my invention, I claim:

1. An article composed largely of zirconia bonded by the reaction products of zircon and phosphoric acid.
2. An article composed largely of zirconia and bonded by a silicon phosphate.
3. An article composed of 82% of zirconia, 9% of milled zircon, and sufficient phosphoric acid to contain 9% of phosphorus pentoxide.

In testimony whereof I affix my signature.

JOHN D. MORGAN.